(12) United States Patent
Medwick et al.

(10) Patent No.: US 10,345,499 B2
(45) Date of Patent: Jul. 9, 2019

(54) SOLAR CONTROL COATING WITH ENHANCED SOLAR CONTROL PERFORMANCE

(71) Applicant: Vitro S.A.B. de C.V., Nuevo Leon (MX)

(72) Inventors: Paul A. Medwick, Wexford, PA (US); Andrew V. Wagner, Pittsburgh, PA (US); James P. Thiel, Lihue, HI (US)

(73) Assignee: Vitro Flat Glass LLC.., Cheswick, PA (US)

( * ) Notice: Subject to any disclaimer, the term of this patent is extended or adjusted under 35 U.S.C. 154(b) by 0 days.

(21) Appl. No.: 15/013,600

(22) Filed: Feb. 2, 2016

(65) Prior Publication Data

US 2016/0223729 A1    Aug. 4, 2016

Related U.S. Application Data

(60) Provisional application No. 62/111,235, filed on Feb. 3, 2015, provisional application No. 62/212,665, filed on Sep. 1, 2015.

(51) Int. Cl.
*G02B 5/28* (2006.01)
*G02B 1/14* (2015.01)
(Continued)

(52) U.S. Cl.
CPC .............. *G02B 5/282* (2013.01); *C03C 17/36* (2013.01); *C03C 17/366* (2013.01);
(Continued)

(58) Field of Classification Search
CPC . G02B 5/20; G02B 5/208; G02B 5/28; G02B 5/281; G02B 5/282; G02B 5/283; G02B 5/284; G02B 5/285; G02B 5/288; G02B 1/10; G02B 1/105; G02B 1/14; C03C 17/34; C03C 17/36; C03C 17/3602; C03C 17/3639; C03C 17/3642; C03C 17/3644; C03C 17/3647; C03C 17/3649; C03C 17/3657; C03C 17/366; C03C 17/3681;
(Continued)

(56) References Cited

U.S. PATENT DOCUMENTS

2006/0287408 A1   12/2006   Baikerikar et al.
2007/0224432 A1    9/2007   Morimoto et al.
(Continued)

FOREIGN PATENT DOCUMENTS

JP     2009215168 A     9/2009
JP      20129873 A      1/2012
(Continued)

OTHER PUBLICATIONS

PCT Search Report, PCT/US2016/016269, dated Jun. 13, 2016.

*Primary Examiner* — Stephone B Allen
*Assistant Examiner* — Adam W Booher
(74) *Attorney, Agent, or Firm* — The Webb Law Firm

(57) ABSTRACT

A solar control coating includes at least four phase adjustment layers and at least four metal functional layers. At least one of the metal functional layers can be a continuous layer. At least one of the metal functional layers can be a subcritical layer. The solar control coating provides reference IGU values of luminous transmittance no greater than 64%, SHGC of no greater than 0.5, and LSG of at least 1.85.

20 Claims, 3 Drawing Sheets

(51) Int. Cl.
*C03C 17/36* (2006.01)
*G02B 5/20* (2006.01)

(52) U.S. Cl.
CPC ...... *C03C 17/3639* (2013.01); *C03C 17/3644* (2013.01); *C03C 17/3681* (2013.01); *G02B 1/14* (2015.01); *G02B 5/208* (2013.01); *C03C 2217/734* (2013.01); *C03C 2217/944* (2013.01)

(58) Field of Classification Search
CPC .......... C03C 2217/734; C03C 2217/94; C03C 2217/944; B32B 7/00; B32B 7/02; B32B 15/00; B32B 15/04; B32B 17/00; B32B 17/06; B32B 17/061; B32B 17/10201; B32B 17/1022; B32B 17/10229
See application file for complete search history.

(56) References Cited

U.S. PATENT DOCUMENTS

| | | | |
|---|---|---|---|
| 2011/0236715 A1 | 9/2011 | Polcyn et al. | |
| 2011/0268941 A1* | 11/2011 | Fischer | B32B 17/10036 |
| | | | 428/213 |
| 2015/0185382 A1* | 7/2015 | Leyder | G02B 5/282 |
| | | | 359/360 |

FOREIGN PATENT DOCUMENTS

| | | | |
|---|---|---|---|
| JP | 2013523494 A | 6/2013 | |
| KR | 1020090018145 A | 2/2009 | |
| WO | 03093188 A1 | 11/2003 | |
| WO | 2011123402 A1 | 10/2011 | |
| WO | 2014164685 A1 | 10/2014 | |

* cited by examiner

SOLAR CONTROL COATING WITH ENHANCED SOLAR CONTROL PERFORMANCE

CROSS REFERENCE TO RELATED APPLICATION

This application claims priority to U.S. Provisional Patent Application Nos. 62/111,235, filed Feb. 3, 2015, and 62/212,665, filed Sep. 1, 2015, both of which are herein incorporated by reference in their entirety.

BACKGROUND OF THE INVENTION

Field of the Invention

This invention relates generally to solar control coatings and, more particularly, to a solar control coating having at least four metal functional layers. One or more of the metal functional layers can be a discontinuous metal layer.

Technical Considerations

Solar control coatings block or filter selected ranges of electromagnetic radiation, typically radiation in the infrared region and/or ultraviolet region of the electromagnetic spectrum. These coatings reduce the amount of solar energy entering a building through transparencies, such as windows, which in turn reduces the heat buildup inside the building. The SHGC, i.e., the fraction of the heat from the sun that enters the building through the transparency, is a measure of how well the transparency blocks solar heat.

Conventional solar control coatings typically have from one to three continuous infrared reflective metal layers. While these conventional coatings provide good solar insulation properties, it would be useful to decrease the SHGC of conventional transparencies even further to improve the solar control properties of the transparency. To decrease the SHGC of these conventional solar control coatings, the thicknesses of the continuous infrared reflective metal layers could be increased. However, this would also make the solar control coating more reflective of visible light. The commercial market prefers transparencies with high transmittance but low visible light reflectance (both interior and exterior visible light reflectance). Further, increasing the thicknesses of the continuous infrared reflective metal layers increases the sensitivity of the solar control coating to random or systematic variations in the thicknesses of the films making up the coating. This can alter or adversely impact upon the performance of the coating or the aesthetics of the coating. Additionally, increasing the thicknesses of the continuous infrared reflective metal layers tends to decrease the durability of the coating to chemical and/or mechanical attack. Moreover, the aesthetic/color space that can be reached with conventional solar control coatings is relatively limited.

Therefore, it would be desirable to provide a solar control coating that provides enhanced solar control and/or aesthetic performance compared to conventional solar control coatings. For example, it would be desirable to provide a solar control coating having a lower solar heat gain coefficient (SHGC) compared to conventional solar control coatings. For example, it would be desirable to provide a solar control coating having a higher light to solar gain ratio (LSG) compared to conventional solar control coatings. For example, it would be desirable to provide a solar control coating having more commercially desirable aesthetics and/ or a larger available color space compared to conventional solar control coatings. For example, it would be desirable to provide a solar control coating having more chemical and/or mechanical durability compared to conventional solar control coatings.

SUMMARY OF THE INVENTION

The invention provides a solar control coating having at least four metal functional layers. At least one of the metal functional layers can be a continuous metal functional layer. At least one of the metal functional layers can be a subcritical metal functional layer.

The solar control coating provides reference insulating glass unit (reference IGU) values of luminous transmittance (T) of not greater than 64 percent, and a solar heat gain coefficient (SHGC) of not greater than 029 at a light to solar gain (LSG) ratio of at least 1.85.

A solar control coating comprises: a first phase adjustment layer; a first metal functional layer located over the first phase adjustment layer; an optional first primer layer located over the first metal functional layer; a second phase adjustment layer located over the first metal functional layer; a second metal functional layer located over the second phase adjustment layer; an optional second primer layer located over the second metal functional layer; a third phase adjustment layer located over the second metal functional layer; a third metal functional layer located over the third phase adjustment layer; an optional third primer layer located over the third metal functional layer; a fourth phase adjustment layer located over the third metal functional layer; a fourth metal functional layer located over the fourth phase adjustment layer; an optional fourth primer layer located over the fourth metal functional layer; an optional fifth phase adjustment layer located over the fourth metal functional layer; and an optional protective layer located over the optional fifth phase adjustment layer.

BRIEF DESCRIPTION OF THE DRAWINGS

The invention will be described with reference to the following drawing figures wherein like reference numbers identify like parks throughout.

DESCRIPTION OF THE PREFERRED EMBODIMENTS

Figure 1:
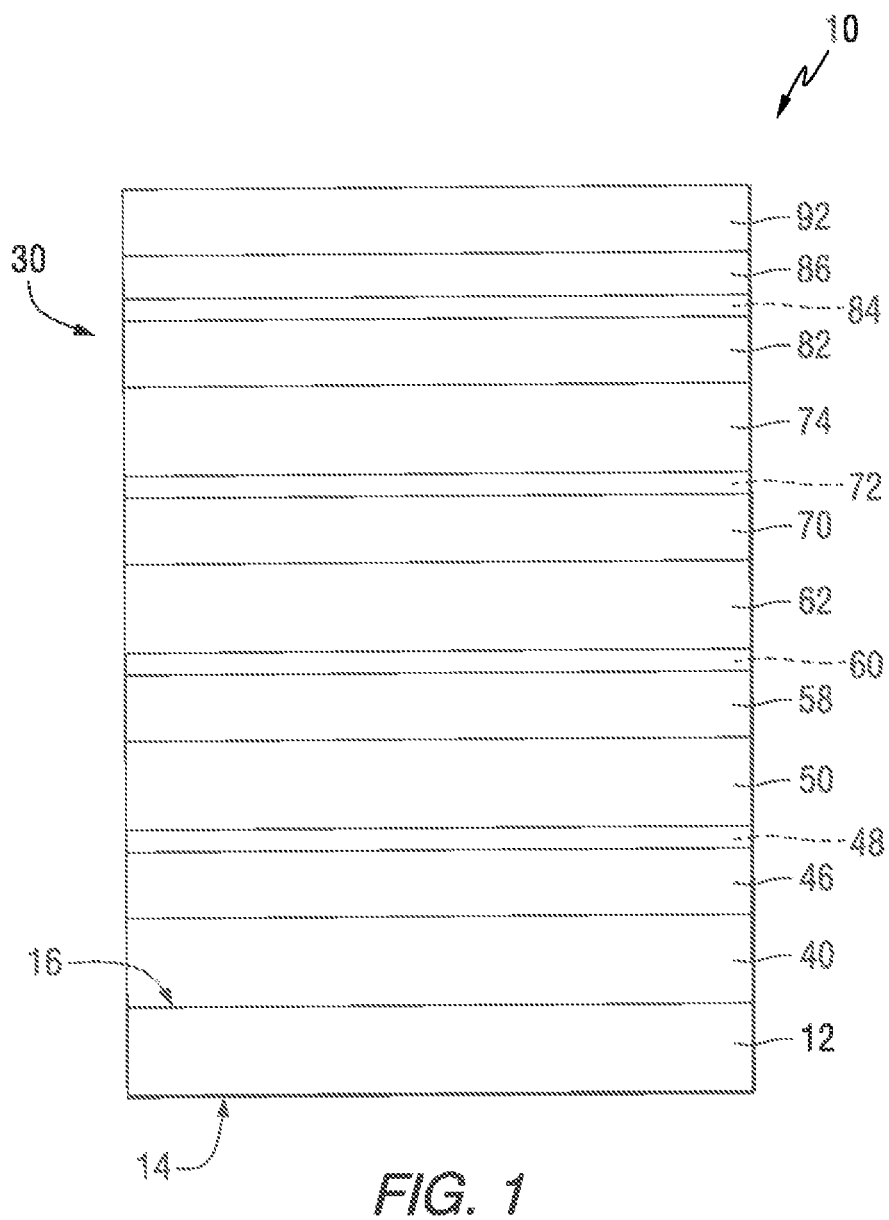
FIG. 1 is a side view (not to scale) of a transparency of the invention in the form of a monolithic transparency having a solar control coating of the invention.

As used herein, spatial or directional terms, such as "left", "right", "inner", "outer", "above", "below", and the like, relate to the invention as it is shown in the drawing figures. However, the invention can assume various alternative orientations and, accordingly, such terms are not to be considered as limiting.

All numbers used in the specification and claims are to be understood as being modified in all instances by the term "about". By "about" is meant a range of plus or minus ten percent of the stated value. All ranges disclosed herein encompass the beginning and ending range values and any and all subranges subsumed therein. The ranges disclosed herein represent the average values over the specified range.

With respect to coating layers described herein, the term "over" means farther from the substrate (or base layer) on which the coating layer is located. For example, a second layer located "over" a first layer means that the second layer is located farther from the substrate (or base layer) than is the first layer. The second layer can be in direct contact with the first layer. Alternatively, one or more other layers can be located between the first layer and the second layer.

The term "film" means a region having a distinct composition. A "layer" comprises one or more "films". A "coating" comprises one or more "layers".

The terms "polymer" or "polymeric" include oligomers, homopolymers, copolymers, and terpolymers, e.g., polymers formed from two or more types of monomers or polymers.

The term "ultraviolet radiation" means electromagnetic radiation having a wavelength in the range of 100 nm to less than 380 nm. The term "visible radiation" means electromagnetic radiation having a wavelength in the range of 380 nm to 780 nm. The term "infrared radiation" means electromagnetic radiation having a wavelength in the range of greater than 780 nm to 100,000 nm. The term "solar infrared radiation" means electromagnetic radiation having a wavelength in the range of 1,000 nm to 3,000 nm. The term "thermal infrared radiation" means electromagnetic radiation having a wavelength in the range of greater than 3,000 nm to 20,000 nm.

All documents referred to herein are "incorporated by reference" in their entirety.

The term "critical thickness" means a thickness above which a material forms a continuous, uninterrupted layer, and below which the material forms discontinuous regions or islands of the material rather than a continuous layer. The term "subcritical thickness" means a thickness below the critical thickness. The term "islanded" means that the material is not a continuous layer but, rather, that the material is in the form of isolated regions or islands.

The term "subcritical layer" means a material deposited below its critical thickness. This is referred to as a subcritical layer even though it is understood that it is not actually a continuous layer.

The term "effective thickness" refers to the theoretical thickness of a material deposited below its critical thickness but at deposition parameters (e.g., deposition rate, line speed, etc.) which would provide a continuous layer of the material at the reported value if it were deposited above its critical thickness. For example, if a material deposited at a deposition line speed of X cm/sec is known to form a continuous layer of 10 nm, then increasing the line speed to 2X would be expected to deposit a coating of 5 nm. However, if 5 nm is below the critical thickness of the material, then the deposited coating would not have a continuous, uniform thickness of 5 nm but would form discontinuous or islanded structures. This is referred to herein as a "subcritical layer" having an "effective thickness" of 5 nm.

LSG (light to solar gain) is the luminous transmittance divided by the SHGC.

The term "optical thickness" means the geometric thickness of the material multiplied by the refractive index of the material at a reference wavelength of 550 nm. For example, a material having a physical thickness of 5 nm and a refractive index of 2 at a reference wavelength of 550 nm would have an optical thickness of 10 nm.

The terms "annealed coating" or "non-temperable coating" refer to a coating which is not tempered or not designed to be tempered for final use. The terms "temperable coating" or "tempered coating" refer to a coating designed to undergo a tempering process for final use.

All thickness values herein are physical thicknesses in nanometers (nm) unless indicated to the contrary.

The terms "metal" and "metal oxide" include silicon and silica, respectively, as well as traditionally recognized metals and metal oxides, even though silicon conventionally may not be considered a metal.

By "at least is" meant "greater than or equal to". By "not greater than" is meant "less than or equal to".

Haze and transmittance values, unless indicated to the contrary, are those determined using a Haze-Gard Plus hazemeter (commercially available from BYK-Gardner USA) or a Perlin Elmer Lamda 9 Spectrophotometer. Sheet resistance values, unless indicated to the contrary, are those determined using a four-point probe (e.g., Nagy Instruments SD-600 measurement device). Surface roughness values are those determined using an Instrument Dimension 3100 Atomic Force Microscope.

A "reference IGU" is defined as having two spaced 6 mm pieces of CLEAR glass separated by a gap of 0.5 inch (1.2 mm) filled with air, with the coating on the No. 2 surface. By "reference IGU value" is meant the reported value when the coating is incorporated into a reference IGU on the No. 2 surface.

The term "solar control coating" refers to a coating comprised of one or more layers or films that affect the solar properties of the coated article, such as the amount of solar radiation reflected from, absorbed by, or passing through the coating.

The discussion of the invention may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

The invention comprises, consists of, or consists essentially of, the following aspects of the invention, in any combination. Various aspects of the invention are illustrated in separate drawing figures. However, it is to be understood that this is simply for ease of illustration and discussion. In the practice of the invention, one or more aspects of the invention shown in one drawing figure can be combined with one or more aspects of the invention shown in one or more of the other drawing figures.

The invention will be discussed with reference to use with an architectural transparency, such as a window or an insulating glass unit (IGU). As used herein, the term "architectural transparency" refers to any transparency located on a building, such as windows and sky lights. However, it is to be understood that the invention is not limited to use with architectural transparencies but could be practiced with transparencies in any desired field, such as laminated or nonlaminated residential and/or commercial windows, insulating glass units, and/or transparencies for land, air, space, above water and/or underwater vehicles. Therefore, it is to be understood that the specifically disclosed exemplary embodiments are presented simply to explain the general concepts of the invention, and that the invention is not limited to these specific exemplary embodiments. Additionally, while a typical "transparency" can have sufficient visible light transmission such that materials can be viewed through the transparency, in the practice of the invention, the "transparency" need not be transparent to visible light but may be translucent or opaque.

Figure 2:
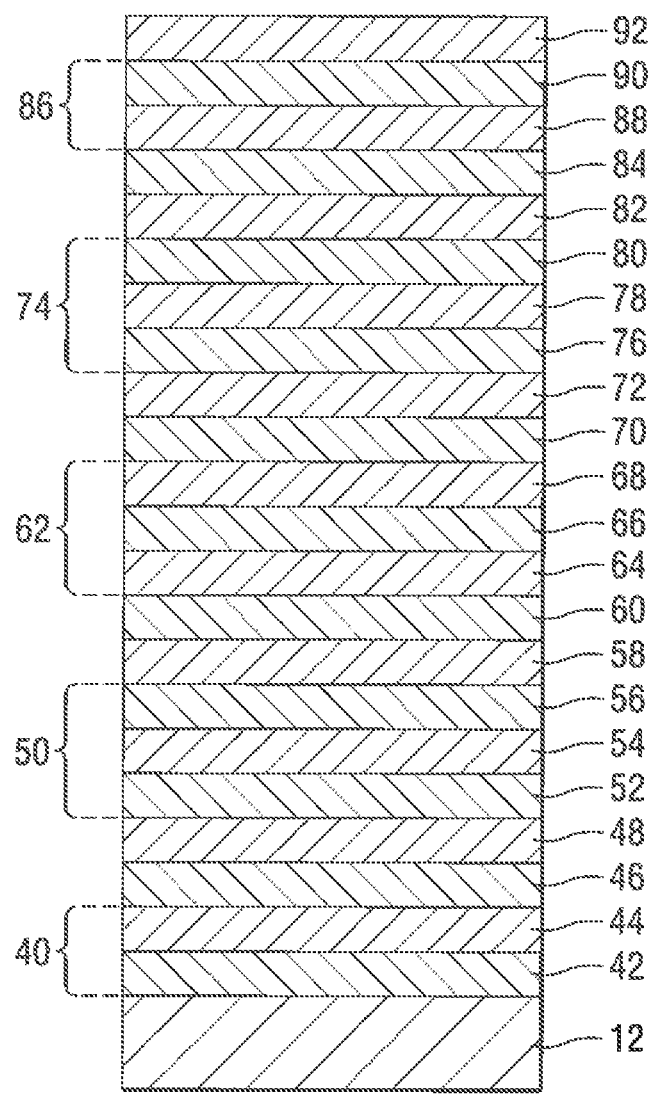
FIG. 2 is a side view (not to scale) of the transparency of FIG. 1 illustrating a multilayer structure of an exemplary solar control coating of the invention.

A transparency 10 incorporating features of the invention is illustrated in FIGS. 1 and 2. The transparency 10 includes a first ply 12 having a first major surface 14 (No. 1 surface) and an opposed second major surface 16 (No. 2 surface). The first major surface 14 faces the exterior of the budding and the second major surface 18 faces the interior of the budding. This numbering of the ply surfaces is in keeping with conventional practice in the fenestration art.

A solar control coating 30 of the invention is located over at least a portion of at least one major surface of one of the first ply 12. In the examples shown in FIGS. 1 and 2, the solar control coating 30 is located over at least a portion of the second major surface 18 (No. 2 surface) of the first ply 12. The solar control coating 30 comprises a first phase adjustment layer 40. A first metal functional layer 46 is located over the first phase adjustment layer 40. An optional first primer layer 48 can be located over the first metal functional layer 46. A second phase adjustment layer 50 is located over the first metal functional layer 46 (or over the optional first primer layer 48, if present). A second metal functional layer 58 is located over the second phase adjustment layer 50. An optional second primer layer 60 can be located over the second metal functional layer 58. A third phase adjustment layer 62 is located over the second metal functional layer 58 (or over the optional second primer layer 60, if present). A third metal functional layer 70 is located over the third phase adjustment layer 62. An optional third primer layer 72 can be located over the third metal functional layer 70. A fourth phase adjustment layer 74 is located over the third metal functional layer 70 (or over the optional third primer layer 72, if present). A fourth metal functional layer 82 is located over the fourth phase adjustment layer 74. An optional fourth primer layer 84 can be located over the fourth metal functional layer 82. An optional fifth phase adjustment layer 86 can be located over the fourth metal functional layer 82 (or over the optional fourth primer layer 84, if present). An optional protective layer 92 can be located over the optional fifth phase adjustment layer 88, if present, or over the fourth metal functional layer 74 (e.g., over the optional fourth primer layer 84, if present).

The first ply 12 can be transparent or translucent to visible radiation. By "transparent" is meant having visible radiation transmittance of greater than 0% up to 100%. Alternatively, the ply can be translucent. By "translucent" is meant diffusing visible radiation such that objects on the side opposite a viewer are not clearly visible. Examples of suitable materials include, but are not limited to, plastic substrates (such as acrylic polymers, such as polyacrylates; polyalkylmethacrylates, such as polymethylmethacrylates, polyethylmethacrylates, polypropylmethacrylates, and the like; polyurethanes; polycarbonates; polyalkylterephthalates, such as polyethyleneterephthalate (PET), polypropyleneterephthalates, polybutyleneterephthalates, and the like; polysiloxane-containing polymers; or copolymers of any monomers for preparing these, or any mixtures thereof); ceramic substrates; glass substrates; or mixtures or combinations of any of the above. For example, the ply can comprise conventional soda-lime-silicate glass, borosilicate glass, or leaded glass. The glass can be clear glass. By "clear glass" is meant non-tinted or non-colored glass. Alternatively, the glass can be tinted or otherwise colored glass. The glass can be annealed or heat-treated glass. As used herein, the term "heat treated" means tempered or at least partially tempered. The glass can be of any type, such as conventional float glass, and can be of any composition having any optical properties, e.g., any value of visible radiation transmittance, ultraviolet radiation transmittance, infrared radiation transmittance, and/or total solar energy transmittance. By "float glass" is meant glass formed by a conventional float process in which molten glass is deposited onto a molten metal bath and controllably cooled to form a float glass ribbon.

The first ply 12 can be, for example, clear float glass or can be tinted or colored glass. The ply can be of any desired dimensions, e.g., length, width, shape, or thickness. Non-limiting examples of glass that can be used for the practice of the invention include clear glass, Starphire®, Solar-green®, Solextra®, GL-20®, GL-35™, Solarbronze®, Solargray® glass, Pacifica® glass, SolarBlue® glass, and Optiblue® glass, all commercially available from PPG Industries Inc. of Pittsburgh, Pa.

The phase adjustment layers 40, 50, 62, 74 are nonmetallic layers. For example, the phase adjustment layers 40, 50, 62, 74 comprise dielectric or semiconductor materials. For example, the phase adjustment layers 40, 50, 62, 74 can comprise oxides, nitrides, oxynitrides, and/or mixtures thereof. Examples of suitable materials for the phase adjustment layers 40, 50, 62, 74 include oxides, nitrides, oxynitrides of titanium, hafnium, zirconium, niobium, zinc, bismuth, lead, indium, tin, and mixtures thereof. These can have small amounts of other materials, such as manganese in bismuth oxide, tin in indium oxide, etc. Additionally, oxides of metal alloys or metal mixtures can be used, such as oxides containing zinc and tin (e.g., zinc stannate), oxides of indium-tin alloys, silicon nitrides, silicon aluminum nitrides, or aluminum nitrides. Further, doped metal oxides, such as antimony or indium doped tin oxides or nickel or boron doped silicon oxides, can be used. Particular examples of materials include zinc oxides, tin oxides, silicon nitrides, silicon-aluminum nitrides, silicon-nickel nitrides, silicon-chromium nitrides, antimony doped tin oxide, aluminum doped zinc oxide, indium doped zinc oxide, titanium oxide, and/or mixtures thereof.

The phase adjustment layers 40, 50, 62, 74 can comprise a single material. Alternatively, the phase adjustment layers 40, 50, 62, 74 can comprise multiple materials and/or multiple layers. The phase adjustment layers 40, 50, 62, 74 can comprise a stratified sequence of films of chemically distinct materials or phases and/or may comprise one or more composites of one or more chemically distinct materials or phases. The different phase adjustment layers 40, 50, 62, 74 can comprise the same or different materials. The phase adjustment layers 40, 50, 62, 74 can have the same or different thicknesses.

The phase adjustment lams 40, 50, 62, 74 allow adjustment of the constructive and destructive optical interference of electromagnetic radiation partially reflected from, and/or partially transmitted by, the various interface boundaries of the layers of the solar control coating 30. Varying the thicknesses and/or compositions of the phase adjustment layers 40, 50, 62, 74 can change the overall reflectance, transmittance, and/or absorptance of the solar control coating 30, which can alter the solar control performance, thermal infrared insulating performance, color, and/or aesthetics of the solar control coating 30. Additionally, the phase adjustment layers 40, 50, 62, 74 can provide chemical and/or mechanical protection for other layers of the solar contra/coating 30, such as the metal functional layers.

Where high visible light transmittance is desired, the phase adjustment layers 40, 50, 62, 74 can act as antireflective layers to antireflect the metal functional layers to reduce the overall visible light reflectance and/or increase the visible light transmittance of the solar control coating 30.

Materials having refractive indices around 2 are particularly useful for antireflection of continuous and/or subcritical metal functional layers.

One or more phase adjustment layers can be located between the ply 12 and the lowermost metal functional layer. One or more phase adjustment layers can be located between the uppermost metal functional layer and the ambient environment, e.g., air.

In the illustrated exemplary coating 30, the first phase adjustment layer 40 is located over at least a portion of the second major surface 16 (the No. 2 surface) of the first ply 12. The first phase adjustment layer 40 can be a single layer or can comprise one or more films of antireflective materials and/or dielectric materials described above. The first phase adjustment layer 40 can be transparent to visible light.

As discussed above, the first phase adjustment layer 40 can comprise a metal oxide, a mixture of metal oxides, and/or a metal ahoy oxide. For example, the first phase adjustment layer 40 can comprise oxides of zinc and tin.

The first phase adjustment layer 40 can have an optical thickness in the range of 46 nm to 75 nm. For example, an optical thickness in the range of 47 nm to 75 nm. For example, an optical thickness in the range of 47 nm to 71 nm. For example, an optical thickness in the range of 50 nm to 65 nm. For example, an optical/thickness in the range of 53 nm to 65 nm.

The first phase adjustment layer 40 can have a thickness in the range of 10 nm to 45 nm. For example, in the range of 15 nm to 40 nm. For example, in the range of 20 nm to 35 nm. For example, in the range of 23 nm to 35 nm. For example, in the range of 26 nm to 33 nm.

The first phase adjustment layer 40 can comprise a multi-film structure having an optional first film 42 and/or a second film 44. The optional first film 42 can be, e.g., a metal alloy oxide film. The second film 44 can be, e.g., a metal oxide film or an oxide mixture film. The second film 44 can be located over the first film 42.

The optional first film 42 can be a zinc/tin alloy oxide. By "zinc/tin alloy oxide" is meant both true allays and also mixtures of the oxides. The zinc/tin alloy oxide can be that obtained from magnetron sputtering vacuum deposition from a cathode of zinc and tin. The cathode can comprise zinc and tin in proportions of 5 wt. % to 95 wt % zinc and 95 wt. % to 5 wt. % tin, such as 10 wt. % to 90 wt. % zinc and 90 wt. % to 10 wt. % tin. However, other ratios of zinc to tin could also be used. An exemplary metal alloy oxide for the first film 42 can be written as $Zn_XSn_{1-X}O_{2-X}$ (Formula 1) where "x" varies in the range of greater than 0 to less than 1. For instance, "x" can be greater than 0 and can be any fraction or decimal between greater than 0 to less than 1. The stoichiometric form of Formula 1 is "$Zn_2SnO_4$", commonly referred to as zinc stannate. A zinc stannate layer can be sputter deposited from a cathode having 52 wt % zinc and 45 wt. % tin in the presence of oxygen. For example, the first film 42 can comprise zinc stannate.

The second film 44 can comprise a metal oxide film. For example, the second film 44 can comprise zinc oxide. The zinc oxide can be deposited from a zinc cathode that includes other materials to improve the sputtering characteristics of the cathode. For example, the zinc cathode can include a small amount of tin (e.g., up to 10 wt. %, such as up to 5 wt. %) to improve sputtering. In which case, the resultant zinc oxide film would include a small percentage of tin oxide, e.g., up to 10 wt. % tin oxide, e.g., up to 5 wt. % tin oxide. A coating layer deposited from a zinc cathode having up to 10 wt. % tin is referred to herein as "a zinc oxide film" even though a small amount of tin oxide (e.g., up to 10 wt. %) may be present. The tin in the cathode is believed to form tin oxide in the predominantly zinc oxide second film 44.

The optional first film 42 can have a thickness in the range of 0 nm to 35 nm. For example, in the range of 10 nm to 30 nm. For example, in the range of 15 nm to 25 nm. For example, in the range of 15 nm to 20 nm.

For example, the second film 44 can have a thickness in the range of 1 nm to 20 nm. For example, in the range of 2 nm to 17 nm. For example, in the range of 3 nm to 15 nm. For example, in the range of 4 nm to 10 nm. For example, in the range of 4 nm to 5 nm.

As illustrated in FIGS. 1 and 2, the solar control coating 30 includes at least four metal functional layers 46, 58, 70, 82.

At least one of the metal functional layers 46, 58, 70, 82 can be a continuous metal layer. By "continuous" metal layer is meant an unbroken or non-disconnected layer, such as a homogeneous layer.

At least one of the metal functional layers 46, 58, 70, 82 can be a subcritical layer. The "subcritical" layer is a broken or disconnected layer or non-homogeneous layer. The subcritical layer can comprise physically separated islands or particles, or a layer with voids or labyrinths (resembling Swiss cheese). Such subcritical layers are typically deposited below the critical thickness (e.g., percolation threshold) of the material. For example, metallic silver has a critical thickness (percolation threshold) below 5 nm. It is believed that copper, gold, and palladium would exhibit similar subcritical behavior below this thickness. Subcritical layers exhibit absorptive Plasmon resonances typically not observed in continuous layers of the same material. The subcritical layer can comprise islands or particles which are embedded or encased in a surrounding matrix comprising the overlying optional primer material (if present) and/or the materials comprising the overlying adjacent phase adjustment layer (or an optional protective layer, if present).

The solar control coating 30 can comprise at least one continuous metal functional layer and/or at least one subcritical metal functional layer.

The metal functional layers provide (a) reflectance of electromagnetic radiation in at least a portion of the infrared radiation region of the electromagnetic spectrum, for example, in the solar infrared radiation region and/or the thermal infrared radiation region of the electromagnetic spectrum, and/or (b) absorptivity of electromagnetic radiation in at least a portion of one or more regions of the electromagnetic spectrum, for example, the visible radiation region and/or the infrared radiation region and/or the ultraviolet radiation region of the electromagnetic spectrum.

Continuous metal functional layers typically have higher reflectivity in the infrared radiation region of the electromagnetic spectrum, for example, in the solar infrared radiation region and/or the thermal infrared radiation region of the electromagnetic spectrum, than subcritical metal functional layers. However, subcritical metal functional layers typically have higher absorbance, such as in the visible radiation region of the electromagnetic spectrum, than continuous metal functional layers.

Examples of materials useful for the metal functional layers include noble or near noble metals. Examples of such metals include silver, gold, platinum, palladium, osmium, iridium, rhodium, ruthenium, copper, mercury, rhenium, aluminum, and combinations thereof. For example, one or more of the metal functional layers can comprise metallic silver.

The first metal functional layer 46 can comprise any of the above metals. For example, the first metal functional layer 46 can comprise silver.

The first metal functional layer 46 can be a continuous layer. Alternatively, the first metal functional layer 46 can be a subcritical layer.

For example, the first metal functional layer 46 can be a continuous layer having a thickness in the range of 5 nm to 20 nm. For example, in the range of 10 nm to 15 nm. For example, in the range of 11 nm to 14 nm. For example, in the range of 11.5 nm to 12.5 nm.

For example, the first metal functional layer 46 can be a subcritical layer having an effective thickness in the range of 1 nm to 5 nm. For example, in the range of 2 nm to 5 nm. For example, in the range of 2 nm to 4 nm.

The optional primer layers 48, 60, 72, 84 are located in direct contact with the associated underlying metal functional layer. The primer layers 48, 60, 72, 84 protect the associated metal functional layers during the coating process and/or subsequent processing, such as thermal tempering. The primer material is deposited as a metal. When deposited over a subcritical layer, the primer material is believed to coat the top of the subcritical material and fill into the spaces between the disconnected islands. During subsequent processing, such as the deposition of the overlying phase adjustment layer and/or thermal tempering, some or all of the metal primer oxidizes. When oxide or nitride materials are used in the phase adjustment layers, the primer layers 48, 60, 72, 84 can comprise oxophillic or nitrophillic materials, respectively. The primer layers 48, 60, 72, 84 need not be all the same material. The primer layers 48, 60, 72, 84 need not be of the same thickness.

Examples of materials useful for the primer layers 48, 60, 72, 84 include titanium, niobium, tungsten, nickel, chromium, iron, tantalum, zirconium, aluminum, silicon, indium, tin, zinc, molybdenum, hafnium, bismuth, vanadium, manganese, and combinations thereof.

The optional first primer layer 48 is located over the first metal functional layer 46. The optional first primer layer 48 can be a single film or a multiple film layer. The first primer layer 48 can comprise any of the materials described above. For example, the first primer layer 48 can comprise titanium.

For example, for an annealed coating, the first primer layer 48 can have a thickness or effective thickness in the range of 0.1 nm to 3 nm. For example, in the range of 1 nm to 3 nm. For example, in the range of 1 nm to 2 nm.

For example, for a temperable coating, the first primer layer 48 can have a thickness or effective thickness in the range of 0.1 nm to 5 nm. For example, in the range of 1 nm to 5 nm. For example, in the range of 2 nm to 4 nm. For example, in the range of 2.5 nm to 3.5 nm.

When the underlying first metal functional layer 46 is a subcritical layer, the first primer layer 48 can have a thickness or effective thickness in the range of 0.1 nm to 2 nm. For example, in the range of 0.5 nm to 1.5 nm. For example, in the range of 1 nm to 1.5 nm.

The second phase adjustment layer 50 is located over the first metal functional layer 46 (e.g., over the optional first primer layer 48). The second phase adjustment layer 50 can comprise one or more of the materials and/or films described above.

The second phase adjustment layer 50 can have an optical thickness in the range of 40 nm to 200 nm. For example, an optical thickness in the range of 50 nm to 150 nm. For example, an optical thickness in the range of 100 nm to 150 nm. For example, an optical thickness in the range of 113 nm to 140 nm. For example, an optical thickness in the range of 115 nm to 120 nm.

The second phase adjustment layer 50 can have a thickness in the range of 30 nm to 100 nm. For example, in the range of 40 nm to 80 nm. For example, in the range of 50 nm to 75 nm. For example, in the range of 55 nm to 70 nm.

The second phase adjustment layer 50 can be a single layer or a multilayer structure. For example, the second phase adjustment layer 50 can include a first film 52, a second film 54, and an optional third film 56.

For example, the first film 52 can comprise a metal oxide film. For example, the first film 52 can comprise a zinc oxide film.

For example, the second film 54 can comprise a metal alloy oxide film. For example, the second film 54 can comprise a zinc stannate film.

For example, the optional third film 56 can comprise a metal oxide film. For example, the optional third film 56 can comprise a zinc oxide film.

For example, the first film 52 (and optional third film 56, if present) can have a thickness in the range of 1 nm to 20 nm. For example, in the range of 2 nm to 17 nm. For example, in the range of 3 nm to 15 nm. For example, in the range of 4 nm to 10 nm. For example, in the range of 4 nm to 5 nm. The first film 52 and the optional third film 56, if present, can comprise the same or different materials and can be of the same or different thickness.

The second film 54 can have a thickness in the range of 5 nm to 70 nm. For example, in the range of 10 nm to 60 nm. For example, in the range of 20 nm to 55 nm. For example, in the range of 30 nm to 54 nm. For example, in the range of 32 nm to 53 nm.

The second metal functional layer 58 is located over the second phase adjustment layer 50 (e.g., over the third film 56, if present, or over the second film 54 if not).

The second metal functional layer 68 can be a continuous layer or a subcritical layer. For example, the second metal functional layer 58 can comprise silver.

For example, the second metal functional layer 58 can be a continuous layer having a thickness in the range of 5 nm to 20 nm. For example, in the range of 10 nm to 15 nm. For example, in the range of 12 nm to 13.5 nm.

For example, the second metal functional layer 58 can be a subcritical layer having an effective thickness in the range of 1 nm to 5 nm. For example, in the range of 2 nm to 5 nm. For example, in the range of 3 nm to 5 nm.

An optional second primer layer 80 can be located over the second metal functional layer 58. The second primer layer 60 can be of any of the materials and/or thicknesses as described above with respect to the optional first primer layer 48. For example, the second primer 60 can comprise titanium.

For example, for an annealed coating, the second primer layer 60 can have a physical thickness or effective thickness in the range of 0.1 nm to 3 nm. For example, in the range of 1 nm to 3 nm. For example, in the range of 1 nm to 2 nm.

For example, for a temperable coating, the second primer layer 60 can have a thickness or effective thickness in the range of 0.1 nm to 5 nm. For example, in the range of 1 nm to 5 nm. For example, in the range of 2 nm to 4 nm. For example, in the range of 2.5 nm to 3.5 nm.

When the underlying second metal functional layer 58 is a subcritical layer, the second primer layer 60 can have a thickness or effective thickness in the range of 0.1 nm to 2 nm. For example, in the range of 0.5 nm to 1.5 nm. For example, in the range of 1 nm to 1.5 nm.

The third phase adjustment layer 62 is located over the second metal functional layer 58 (e.g., over the optional second primer film 60). The third phase adjustment layer 62 can include any of the materials and/or layers as discussed above with respect to the first and second phase adjustment layers 40, 50. For example, the third phase adjustment layer 62 can be a multi-film structure. For example, the third phase adjustment layer 62 can include a first layer 64, a second layer 66, and an optional third layer 68.

The third phase adjustment layer 62 can have an optical thickness in the range of 40 nm to 100 nm. For example, an optical thickness in the range of 50 nm to 90 nm. For example, an optical thickness in the range of 57 nm to 87 nm. For example, an optical thickness in the range of 64 nm to 80 nm.

The third phase adjustment layer 62 can have a thickness in the range of 20 nm to 100 nm. For example, in the range of 25 nm to 45 nm. For example, in the range of 30 nm to 40 nm. For example, in the range of 35 nm to 37 nm.

The first layer 64 can comprise a metal oxide layer. For example, a zinc oxide layer. The second layer 66 can comprise a metal alloy oxide material. For example, zinc stannate. The optional third layer 68 can comprise a metal oxide layer. For example, a zinc oxide layer.

For example, the first layer 64 can have a thickness in the range of 1 nm to 20 nm. For example, in the range of 2 nm to 17 nm. For example, in the range of 3 nm to 15 nm. For example, in the range of 4 nm to 10 nm. For example, in the range of 4 nm to 5 nm.

The second layer 66 can have a thickness in the range of 5 nm to 70 nm. For example, in the range of 10 nm to 60 nm. For example, in the range of 15 nm to 50 nm. For example, in the range of 20 nm to 40 nm. For example, in the range of 21 nm to 31 nm.

The optional third layer 68 can have a thickness in the range of 0 nm to 20 nm. For example, in the range of 1 nm to 17 nm. For example, in the range of 3 nm to 15 nm. For example, in the range of 4 nm to 10 nm.

The third metal functional layer 70 can include any of the materials discussed above with respect to the first or second metal functional layers 46, 58. For example, the third metal functional layer 70 can comprise silver.

The third metal functional layer 70 can be a continuous layer or a subcritical layer.

For example, the third metal functional layer 70 can be a continuous layer having a thickness in the range of 5 nm to 20 nm. For example, in the range of 5 nm to 15 nm. For example, in the range of 5 nm to 10 nm.

For example, the third metal functional layer 70 can be a subcritical layer having an effective thickness in the range of 0.2 nm to 5 nm. For example, in the range of 0.3 nm to 1 nm. For example, in the range of 0.4 him to 0.9 nm. For example, in the range of 0.4 nm to 0.5 nm.

The optional third primer layer 72 can be as described above with respect to the first or second primer layers. For example, the third primer layer 72 can comprise titanium.

For example, for an annealed coating, the third primer layer 72 can have a thickness or effective thickness in the range of 0.1 nm to 3 nm. For example, in the range of 1 nm to 3 nm. For example, in the range of 1 nm to 2 nm.

For example, for a temperable coating, the third primer layer 72 can have a thickness or effective thickness in the range of 0.1 nm to 5 nm. For example, in the range of 1 nm to 5 nm. For example, in the range of 2 nm to 4 nm. For example, in the range of 2.5 nm to 3.5 nm.

When the underlying second metal functional layer 58 is a subcritical layer, the third primer layer 72 can have a thickness or effective thickness in the range of 0.1 nm to 2 nm. For example, in the range of 0.5 nm to 1.5 nm. For example, in the range of 1 nm to 1.5 nm.

The fourth phase adjustment layer 74 can be comprised of one or more of the materials and/or layers discussed above with respect to the first, second, or third phase adjustment layers 40, 50, 62.

The fourth phase adjustment layer 74 can have an optical thickness in the range of 40 nm to 150 nm. For example, an optical thickness in the range of 50 nm to 90 nm. For example, an optical thickness in the range of 55 nm to 86 nm. For example, an optical thickness in the range of 64 nm to 80 nm.

The fourth phase adjustment layer 74 can have a thickness in the range of 20 nm to 100 nm. For example, in the range of 25 nm to 60 nm. For example, in the range of 30 nm to 45 nm. For example, in the range of 32 nm to 40 nm.

The fourth phase adjustment layer 74 can be a multi-film layer having an optional first layer 76, a second layer 78, and a third layer 80.

For example, the optional first layer can comprise a metal oxide layer. For example, a zinc oxide layer. The second layer 78 can comprise a metal ahoy oxide layer. For example, a zinc stannate layer. The third layer 80 can comprise a metal oxide layer. For example, a zinc oxide layer.

The second layer 78 can have a thickness in the range of 5 nm to 70 nm. For example, in the range of 10 nm to 60 nm. For example, in the range of 15 nm to 50 nm. For example, in the range of 20 nm to 45 nm. For example, in the range of 20 nm to 35 nm. For example, in the range of 21 nm to 31 nm.

The optional first layer 76 can have a thickness in the range of 0 nm to 20 nm. For example, in the range of 1 nm to 20 nm. For example, in the range of 2 nm to 17 nm. For example, in the range of 3 nm to 15 nm. For example, in the range of 4 nm to 10 nm. For example, in the range of 4 nm to 5 nm.

The third layer 80 can have a thickness in the range of 1 nm to 20 nm. For example, in the range of 2 nm to 17 nm. For example, in the range of 3 nm to 15 nm. For example, in the range of 4 nm to 10 nm. For example, in the range of 4 nm to 5 nm.

The fourth metal functional layer 82 can be of any of the materials discussed above with respect to the first, second, and/or third metal functional layers. For example, the fourth metal functional layer 82 can comprise silver.

The fourth metallic layer 82 can be a continuous layer or a subcritical layer.

For example, the fourth metal functional layer 82 can be a continuous layer having a thickness in the range of 5 nm to 30 nm. For example, in the range of 15 nm to 26 nm. For example, in the range of 17 nm to 26 nm. For example, in the range of 19 nm to 25 nm.

For example, the fourth metal functional layer 82 can be a subcritical layer having an effective thickness in the range of 1 nm to 5 nm. For example, in the range of 1.5 nm to 5 nm. For example in the range of 2 nm to 5 nm. For example in the range of 2 nm to 4 nm. For example in the range of 2 nm to 3 nm.

The optional fourth primer layer 84 can be as described above with respect to any of the other optional primer layers. For example, the fourth primer layer 84 can comprise titanium.

For example, for an annealed coating, the fourth primer layer 84 can have a thickness or effective thickness in the range of 0.1 nm to 3 nm. For example, in the range of 1 nm to 3 nm. For example, in the range of 1 nm to 2 nm.

For example, for a temperable coating, the fourth primer layer 84 can have a thickness or effective thickness in the range of 0.1 nm to 5 nm. For example, in the range of 1 nm to 5 nm. For example, in the range of 2 nm to 4 nm. For example, in the range of 2.5 nm to 3.5 nm.

When the underlying fourth metal functional layer 82 is a subcritical layer, the fourth primer layer 84 can have a thickness or effective thickness in the range of 0.1 nm to 2 nm. For example, in the range of 0.5 nm to 1.5 nm. For example, in the range of 1 nm to 1.5 nm.

The optional fifth phase adjustment layer 86 can be comprised of one or more materials and/or layers as discussed above with respect to the first, second, or third phase adjustment layers.

The optional fifth phase adjustment layer 86 can have an optical thickness in the range of 40 nm to 100 nm. For example, an optical thickness in the range of 40 nm to 80 nm. For example, an optical thickness in the range of 45 nm to 75 nm. For example, an optical thickness in the range of 54 nm to 67 nm.

The optional fifth phase adjustment layer 86 can have a thickness in the range of 10 nm to 100 nm. For example, in the range of 20 nm to 50 nm. For example, in the range of 24 nm to 37 nm. For example, in the range of 27 nm to 34 nm.

The fifth phase adjustment layer 86 can comprise a first layer 88 and an optional second layer 90.

The first layer 88 can comprise a metal oxide layer. For example, a zinc oxide layer. The optional second layer 90 can comprise a metal-alloy oxide layer. For example, a zinc stannate layer.

The first layer 88 can have a thickness in the range of 1 nm to 20 nm. For example, in the range of 2 nm to 17 nm. For example, in the range of 3 nm to 15 nm. For example, in the range of 4 nm to 10 nm. For example, in the range of 4 nm to 5 nm.

The optional second layer 90 can have a thickness in the range of 0 nm to 40 nm. For example, in the range of 10 nm to 35 nm. For example, in the range of 15 nm to 30 nm. For example, in the range of 20 nm to 30 nm. For example, in the range of 20 nm to 25 nm.

The optional protective layer 92 can be the terminal layer of the solar control coating 30. The optional protective layer 92 can comprise one or more nonmetallic materials, such as those described above with regard to the phase adjustment layers. Alternatively, the protective layer 92 can comprise a metal material. The optional protective layer 92 can provide chemical and/or mechanical protection to the underlying coating layers. The optional protective layer 92 can provide phase adjustment and/or absorption.

In addition to or instead of the terminal optional protective layer 92, one or more other optional protective layers 92 can be located within the solar control coating 30. For example, between two or more of the phase adjustment layers.

The optional protective layer 92 can be, for example, a metal oxide or metal nitride layer.

For example, the protective layer 92 can comprise titania.

The optional protective layer 92 can have a thickness in the range of 0 nm to 10 nm. For example, in the range of 1 nm to 10 nm. For example, in the range of 2 nm to 8 nm. For example, in the range of 3 nm to 7 nm. For example, in the range of 4 nm to 7 nm.

The solar control coating 30 of the invention can have at least four continuous metal functional layers.

Or, the solar control coating 30 can have at least four metal functional layers, with at least one of the metal functional layers being a subcritical layer. For example, the subcritical layer can be positioned between two continuous layers. And/or the subcritical layer can be between the substrate and the first phase adjustment layer. And/or, the subcritical layer can be between the uppermost continuous layer and the environment.

For example, the third metal functional layer 70 can be located symmetrically or substantially symmetrically between the third phase adjustment layer 62 and the fourth phase adjustment layer 74. For example, the third phase adjustment layer 62 and the fourth phase adjustment layer 74 can have the same or similar thickness. For example, the thicknesses of the third phase adjustment layer 62 and the fourth phase adjustment layer 74 can be within plus or minus ten percent of each other. For example, within plus or minus five percent of each other. For example, within plus or minus two percent of each other.

For example, the third metal functional layer 70 can be a subcritical layer. The third metal functional layer 70 can be located intermediate the third and fourth phase adjustment layers 62, 74 (symmetric design). Alternatively, the third and fourth phase adjustment layers 62, 74 can have more disparate thicknesses, with a subcritical third metal functional layer 70 located between (but not necessarily intermediate) the third and fourth phase adjustment layers 62, 74.

The present invention provides a coating, for example, a solar control coating 30, comprising at least four metal functional layers. All of the metal functional layers can be continuous layers. Or, as described above, one or more of the metal functional layers can be a subcritical layer.

The solar control coating 30 can be deposited by any conventional method. Examples of such methods include conventional chemical vapor deposition (CVD) and/or physical vapor deposition (PVD) methods. Examples of CVD processes include spray pyrolysis. Examples of PVD processes include electron beam evaporation and vacuum sputtering (such as magnetron sputter vapor deposition (MSVD)). Other coating methods could also be used, such as, but not limited to, sol-gel deposition. In one non-limiting embodiment, the coating 30 can be deposited by MSVD.

The solar control coating 30 can have at least four metal functional layers, with at least one of the metal functional layers being a subcritical layer. For example, the subcritical layer can be located between two continuous metal functional layers. And/or the subcritical metallic layer can be located between the substrate and the first phase adjustment layer. And/or, the subcritical metal functional layer can be located an uppermost continuous metal functional layer and the environment.

Figure 3:
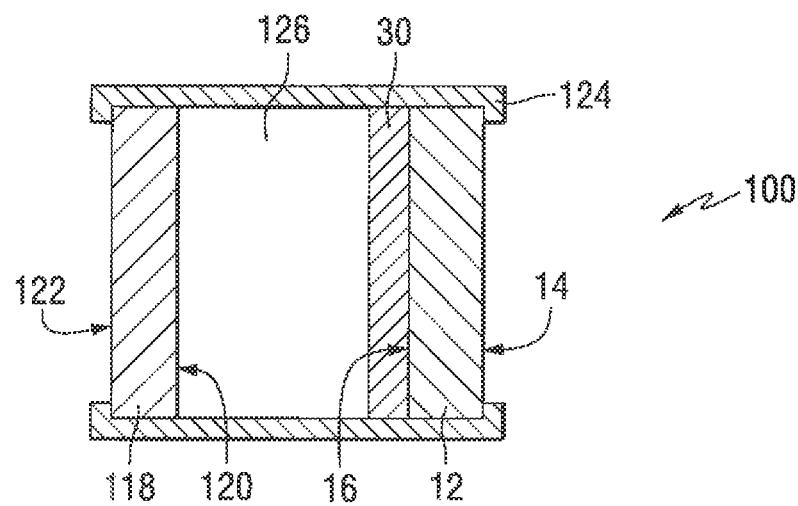
FIG. 3 is a side view (not to scale) of a transparency of FIGS. 1 and 2 incorporated into an insulated glass unit (IGU)

FIG. 3 shows the transparency 10 of FIGS. 1 and 2 incorporated into an insulating glass unit (IGU) 100. The first major surface 14 (No. 1 surface) faces the building exterior, i.e., is an outer major surface, and the second major surface 16 (No. 2 surface) faces the interior of the budding. The insulating glass unit 100 includes a second ply 118 having an outwardly facing major surface 120 (No. 3 surface) and an inwardly facing major surface 122 (No. 4 surface). The second ply 118 is spaced from the first ply 12. This numbering of the ply surfaces is in keeping with conventional practice in the fenestration art.

The first and second plies 12, 118 can be connected together in any suitable manner, such as by being adhesively bonded to a conventional spacer frame 124. A gap or chamber 126 is formed between the two plies 12, 118. The chamber 128 can be filled with a selected atmosphere, such as gas, for example air or a non-reactive gas such as argon or krypton gas. In the illustrated example, the solar control coating 30 located on the No. 2 surface 16. However, the solar control coating 30 could be located on any of the other surfaces.

The second ply 118 can be of any of the materials described above for the first ply 12. The second ply 118 can be the same as the first ply 12 or the second ply 118 can be different than the first ply 12. The first and second plies 12, 118 can each be, for example, clear float glass or can be tinted or colored glass or one ply 12, 118 can be clear glass and the other ply 12, 118 colored glass.

The solar control coating 30 provides a reference IGU SHGC of not greater than 0.3. For example, not greater than 0.29. For example, not greater than 0.28. For example, not greater than 0.27. For example, not greater than 0.26. For example, not greater than 0.5. For example, not greater than 0.24.

For example, the solar control coating 30 provides a reference IGU SHGC in the range of 0.3 to 0.25. For example, in the range of 0.23 to 0.24.

The solar control coating 30 provides a reference IGU luminous transmittance of not greater than 70%. For example, not greater than 65%. For example, not greater than 60%. For example, not greater than 57%. For example, not greater than 55%. For example, not greater than 52%.

The solar control coating 30 provides a reference IGU LSG ratio of at least 1.8. For example, at least 1.85. For example, at least 1.9. For example, at least 2.

The solar control coating 30 provides a reference IGU SHGC of not greater than 0.29 and an LSG ratio of at least 1.85. For example, a SHGC of not greater than 0.24 and an LSG ratio of at least 1.85. For example, a SHGC of not greater than 0.24 and an LSG ratio of at least 2.

Figure 4:
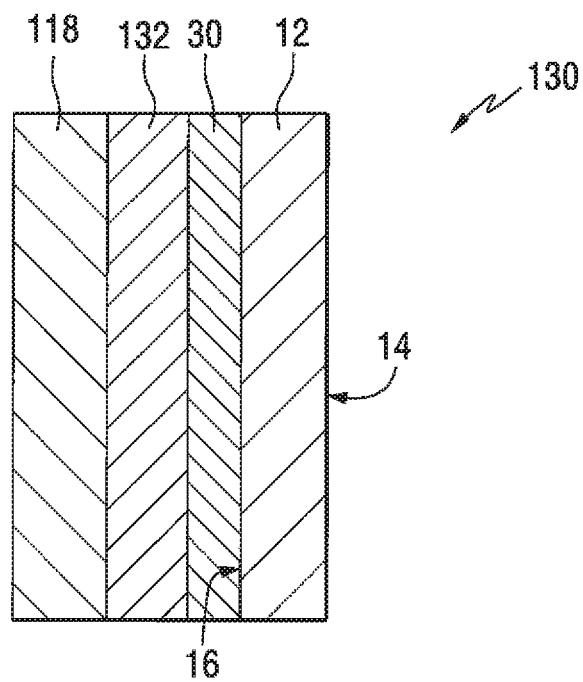
FIG. 4 is a side view (not to scale) of the transparency of FIGS. 1 and 2 incorporated into a laminated unit.

FIG. 4 shows the transparency 10 incorporated into a laminated unit 130. The laminated unit 130 includes the first ply 12 and the second ply 118 connected by a polymeric interlayer 132. The solar control coating 30 is shown on the No. 2 surface 16. However, as with the IGU 100 described above, the solar control coating 30 could be on any of the surfaces 14, 16, 120, or 122.

The solar control coating 30 provides a sheet resistance of less than 10 ohms per square (Ω/□). For example, less than 5Ω/□. For example, less than 2Ω/□. For example, less than 1Ω/□.

The laminated unit 130 has a transmitted L* in the range of 70 to 90. For example, in the range of 75 to 90. For example, in the range of 80 to 90. For example, in the range of 85 to 90.

The laminated unit 130 has a transmitted a* in the range of 0 to −5. For example, in the range of −2 to −4.5. For example, in the range of −3.5 to −4.

The laminated unit 130 has a transmitted b* in the range of 0 to 5. For example, in the range of 2 to 5. For example, in the range of 3 to 5. For example, in the range of 3.5 to 4.5.

The laminated unit 130 has a reflected (exterior) L* in the range of 20 to 40. For example, in the range of 25 to 35. For example, in the range of 30 to 35.

The laminated unit 130 has a reflected (exterior) a* in the range of 0 to −5. For example, in the range of 0 to −4. For example, in the range of −1 to −3.

The laminated unit 130 has a reflected (exterior) b* in the range of 0 to −5. For example, in the range of 0 to −4. For example, in the range of 0 to −3. For example, in the range of 0 to −2.

The laminated unit 130 has a reflected (interior) L* in the range of 20 to 40. For example, in the range of 25 to 36. For example, in the range of 30 to 35.

The laminated unit 130 has a reflected (interior) a* in the range of 0 to −5. For example, in the range of 0 to −4. For example, in the range of −1 to −3.

The laminated unit 130 has a reflected (interior) b* in the range of −2 to 4. For example, in the range of −1 to 3. For example, in the range of −1 to 2.

EXAMPLES

Table 1 shows various examples of a coating of the invention. The values are in nanometers. Samples 1-8 were made using an Airco ILS-1600 coater. Samples 9-13 are computer modeled samples using WINDOW software available from Lawrence Berkeley National Laboratory. "A" means annealed coating, "T" means temperable coating. "ZS" means zinc stannate. "ZO" means zinc oxide (which may include up to 10 wt. % tin oxide). "Ag" means silver. "Ti($O_x$)" means titanium primer. As discussed above, the primer is deposited as a metal and ail or at least part of the primer is subsequently oxidized during subsequent processing steps. "TO" means titania.

Table 2 shows reference IGU optical data for some of the Samples of Table 1. "HT" means heat treated. "T" means transmittance (CIE Illuminant A). "RE" means exterior reflectance. "RI" means interior reflectance. "E" means emissivity. "SHGC" means solar heat gain coefficient. "LSG" means light to solar gain ratio. L*, a*, and b* are in accordance with CIE color coordinates. The optical data for Samples 9-11 in Table 2 was calculated using WINDOW software available from Lawrence Berkeley National Laboratory. The values were calculated based on a reference IGU having two spaced 6 mm pieces of CLEAR glass separated by a gap of 0.5 inch (1.2 mm) filled with air, with the coating on the No. 2 surface.

The invention can further be described with reference to the following numbered clauses.

Clause 1: A solar control coating 30, comprising: a first phase adjustment layer 40; a first metal functional layer 46 located over the first phase adjustment layer 40; an optional first primer layer 48 located over the first metal functional layer 46; a second phase adjustment layer 50 located over the first metal functional layer 46; a second metal functional layer 58 located over the second phase adjustment layer 50; an optional second primer layer 60 located over the second metal functional layer 58; a third phase adjustment layer 62 located over the second metal functional layer 58; a third metal functional layer 70 located over the third phase adjustment layer 62; an optional third primer layer 72 located over the third metal functional layer 70; a fourth phase adjustment layer 74 located over the third metal functional layer 70; a fourth metal functional layer 82 located over the fourth phase adjustment layer 74; an optional fourth primer layer 84 boated over the fourth metal functional layer 82; an optional fifth phase adjustment layer 86 located over the fourth metal functional layer 82; and an optional protective layer 92 located over the optional fifth phase adjustment layer 86.

Clause 2: The solar control coating 30 of clause 1, wherein the phase adjustment layers 40, 50, 62, 74 comprise nonmetallic layers.

Clause 3: The solar control coating 30 of clauses 1 or 2, wherein the phase adjustment layers 40, 50, 62, 74 comprise dielectric or semiconductor materials.

Clause 4: The solar control coating 30 of any of clauses 1 to 3, wherein the phase adjustment layers 40, 50, 62, 74 comprise oxides, nitrides, oxynitrides, and/or mixtures thereof.

Clause 5: The solar control coating 30 of any of clauses 1 to 4, wherein the phase adjustment layers 40, 50, 62, 74 comprise oxides, nitrides, or oxynitrides of titanium, hafnium, zirconium, niobium, zinc, bismuth, lead, indium, tin, and mixtures thereof.

Clause 6: The solar control coating 30 of any of clauses 1 to 5, wherein the phase adjustment layers 40, 50, 02, 74 comprise tin oxides, silicon nitrides, silicon-aluminum nitrides, silicon-nickel nitrides, silicon-chromium nitrides, antimony doped tin oxide, aluminum doped zinc oxide, indium doped zinc oxide, titanium oxide, and/or mixtures thereof.

Clause 7: The solar control coating 30 of any of clauses 1 to 6, wherein the first phase adjustment layer 40 comprises a metal oxide, a mixture of metal oxides, and/or a metal alloy oxide, such as oxides of zinc and tin.

Clause 8: The solar control coating 30 of any of clauses 1 to 7, wherein the first phase adjustment layer 40 has an optical thickness in the range of 45 nm to 75 nm, particularly an optical thickness in the range of 47 nm to 71 nm, more particularly an optical thickness in the range of 53 nm to 65 nm.

Clause 9: The solar control coating 30 of any of clauses 1 to 8, wherein the first phase adjustment layer 40 has a thickness in the range of 20 nm to 35 nm, particularly in the range of 23 nm to 35 nm, more particularly in the range of 26 nm to 33 nm.

Clause 10: The solar control coating 30 of any of clauses 1 to 9, wherein the first phase adjustment layer 40 comprises an optional first film 42 and a second film 44.

Clause 11: The solar control coating 30 of clause 10, wherein the optional first film 42 comprises a metal alloy oxide film, and wherein the second film 44 comprises a metal oxide film or an oxide mixture film.

Clause 12: The solar control coating 30 of clauses 10 or 11, wherein the optional first film 42 comprises a zinc/tin alloy oxide, particularly zinc stannate.

Clause 13: The solar control coating 30 of any of clauses 10 to 12, wherein the second film 44 comprises a metal oxide film, particularly zinc oxide.

Clause 14: The solar control coating 30 of any of clauses 10 to 13, wherein the optional first film 42 has a thickness in the range of 0 nm to 36 nm, particularly in the range of 15 nm to 25 nm, more particularly in the range of 15 nm to 20 nm.

Clause 15: The solar control coating 30 of any of clauses 10 to 14, wherein the second film 44 has a thickness in the range of 1 nm to 20 nm, particularly in the range of 3 nm to 15 nm, more particularly in the range of 4 nm to 10 nm.

Clause 16: The solar control coating 30 of any of clauses 1 to 15, wherein at least one of the metal functional layers 46, 58, 70, 82 comprises a continuous metal layer.

Clause 17: The solar control coating 30 of any of clauses 1 to 16, wherein at least one of the metal functional layers 46, 58, 70, 82 comprises a subcritical layer.

Clause 18: The solar control coating 30 of any of clauses 1 to 17, wherein the metal functional layers comprise at least one noble or near noble metal, particularly selected from silver, gold, platinum, palladium, osmium, iridium, rhodium, ruthenium, copper, mercury, rhenium, aluminum, and combinations thereof, more particularly metallic silver.

Clause 19: The solar control coating 30 of any of clauses 1 to 18, wherein the first metal functional layer 46 comprises silver.

Clause 20: The solar control coating 30 of any of clauses 1 to 19, wherein the first metal functional layer 46 comprises a continuous layer or a subcritical layer, particularly a continuous layer.

Clause 21: The solar control coating 30 of any of clauses 1 to 20, wherein the first metal functional layer 46 has a thickness in the range of 10 nm to 15 nm, particularly in the range of 11 nm to 14 nm, more particularly in the range of 11.5 nm to 12.5 nm.

Clause 22: The solar control coating 30 of any of clauses 1 to 21, wherein the primer layers 48, 60, 72, 84 are selected from titanium, niobium, tungsten, nickel, chromium, iron, tantalum, zirconium, aluminum, silicon, indium, tin, zinc, molybdenum, hafnium, bismuth, vanadium, manganese, and combinations thereof, particularly titanium.

Clause 23: The solar control coating 30 of any of clauses 1 to 22, wherein the first primer layer 48 has a thickness or effective thickness in the range of 1 nm to 5 nm, particularly in the range of 2 nm to 4 nm, more particularly in the range of 2.5 nm to 3.5 nm.

Clause 24: The solar control coating 30 of any of clauses 1 to 23, wherein the second phase adjustment layer 50 has an optical thickness in the range of 40 nm to 200 nm, particularly an optical thickness in the range of 100 nm to 150 nm, more particularly an optical thickness in the range of 115 nm to 120 nm.

Clause 25: The solar control coating 30 of any of clauses 1 to 24, wherein the second phase adjustment layer 50 has a thickness in the range of 30 nm to 100 nm, particularly in the range of 50 nm to 75 nm, more particularly in the range of 55 nm to 70 nm.

Clause 26: The solar control coating 30 of any of clauses 1 to 25, wherein the second phase adjustment layer 50 comprises a first film 52, a second film 54, and an optional third film 56.

Clause 27: The solar control coating 30 of clause 26, wherein the first film 52 comprises a metal oxide film, particularly a zinc oxide film.

Clause 28: The solar control coating 30 of clauses 26 or 27, wherein the second film 54 comprises a metal alloy oxide film, particularly a zinc stannate film.

Clause 29: The solar control coating 30 of any of clauses 26 to 28, wherein the optional third film 56 comprises a metal oxide film, particularly a zinc oxide film.

Clause 30: The solar control coating 30 of any of clauses 26 to 29, wherein the first film 52 and/or the optional third film 56 have a thickness in the range of 1 nm to 20 nm, particularly in the range of 3 nm to 15 nm, more particularly in the range of 4 nm to 10 nm.

Clause 31: The solar control coating 30 of any of clauses 26 to 30, wherein the second film 54 has a thickness in the range of 5 nm to 70 nm, particularly in the range of 30 nm to 54 nm, more particularly in the range of 32 nm to 53 nm.

Clause 32: The solar control coating 30 of any of clauses 1 to 31, wherein the second metal functional layer 58 comprises a continuous layer or a subcritical layer, particularly a continuous layer.

Clause 33: The solar control coating 30 of any of clauses 1 to 32, wherein the second metal functional layer 58 has a thickness in the range of 5 nm to 20 nm, particularly in the range of 10 nm to 15 nm, more particularly in the range of 12 nm to 13.5 nm.

Clause 34: The solar control coating 30 of any of clauses 1 to 33, wherein the second primer layer 60 has a thickness or effective thickness in the range of 0.1 nm to 5 nm, particularly in the range of 1 nm to 5 nm, more particularly in the range of 2 nm to 4 nm.

Clause 35: The solar control coating 30 of any of clauses 1 to 34 wherein the third phase adjustment layer 62 includes a first layer 64, a second layer 66, and an optional third layer 68.

Clause 36: The solar control coating 30 of any of clauses 1 to 35, wherein the third phase adjustment layer 62 has an optical thickness in the range of 40 nm to 100 nm, particularly an optical thickness in the range of 57 nm to 87 nm, more particularly an optical thickness in the range of 64 nm to 80 nm.

Clause 37: The solar control coating 30 of any of clauses 1 to 36, wherein the third phase adjustment layer 62 has a thickness in the range of 20 nm to 100 nm, particularly in the range of 30 nm to 40 nm, more particularly in the range of 35 nm to 37 nm.

Clause 38: The solar control coating 30 of any of clauses 35 to 37, wherein the first layer 64 and/or the optional third layer 68 comprises a metal oxide layer, particularly a zinc oxide layer.

Clause 39: The solar control coating 30 of any of clauses 35 to 38, wherein the second layer 66 comprises a metal alloy oxide material, particularly zinc stannate.

Clause 40: The solar control coating 30 of any of clauses 35 to 39, wherein the first layer 84 and/or optional third layer 68 have a thickness in the range of 1 nm to 20 nm, particularly in the range of 3 nm to 15 nm, more particularly in the range of 4 nm to 10 nm.

Clause 41: The solar control coating 30 of any of clauses 35 to 40, wherein the second layer 66 has a thickness in the range of 5 nm to 70 nm, particularly in the range of 15 nm to 50 nm, more particularly in the range of 21 nm to 31 nm.

Clause 42: The solar control coating 30 of any of clauses 1 to 41, wherein the third metal functional layer 70 comprises a continuous layer or a subcritical layer, particularly a subcritical layer.

Clause 43: The solar control coating 30 of any of clauses 1 to 42, wherein the third metal functional layer 70 has an effective thickness in the range of 0.2 nm to 1 nm, particularly in the range of 0.3 nm to 0.9 nm, more particularly in the range of 0.4 nm to 0.5 nm.

Clause 44: The solar control coating 30 of any of clauses 1 to 43, wherein the optional third primer layer 72 has a thickness or effective thickness in the range of 0.1 nm to 2 nm, particularly in the range of 0.5 nm to 1.5 nm, more particularly in the range of 1 nm to 1.5 nm.

Clause 45: The solar control coating 30 of any of clauses 1 to 44, wherein the fourth phase adjustment layer 74 has an optical thickness in the range of 40 nm to 150 nm, particularly an optical thickness in the range of 55 nm to 86 nm, more particularly an optical thickness in the range of 64 nm to 80 nm.

Clause 46: The solar control coating 30 of any of clauses 1 to 45, wherein the fourth phase adjustment layer 74 has a thickness in the range of 20 nm to 100 nm, particularly in the range of 30 nm to 45 nm, more particularly in the range of 32 nm to 40 nm.

Clause 47: The solar control coating 30 of any of clauses 1 to 46, wherein the fourth phase adjustment layer 74 comprises an optional first layer 76, a second layer 78, and a third layer 50.

Clause 48: The solar control coating 30 of clause 47, wherein the optional first layer 76 and/or the third layer 80 comprises a metal oxide layer, particularly a zinc oxide layer.

Clause 49: The solar control coating 30 of clauses 47 or 48, wherein the second layer 78 comprises a metal alloy oxide layer, particularly a zinc stannate layer.

Clause 50: The solar control coating 30 of any of clauses 47 to 49, wherein the second layer 78 has a thickness in the range of 5 nm to 70 nm, particularly in the range of 20 nm to 45 nm, more particularly in the range of 21 nm to 31 nm.

Clause 51: The solar control coating 30 of any of clauses 47 to 50, wherein the optional first layer 76 and/or the third layer 80 have a thickness in the range of 0 nm to 20 nm, particularly in the range of 3 nm to 15 nm, more particularly in the range of 4 nm to 10 nm.

Clause 52: The solar control coating 30 of any of clauses 1 to 51, wherein the fourth metal functional layer 82 comprises a continuous layer or a subcritical layer, particularly a continuous layer.

Clause 53: The solar control coating 30 of any of clauses 1 to 52, wherein the fourth metal functional layer 82 has a thickness in the range of 5 nm to 30 nm, particularly in the range of 15 nm to 26 nm, more particularly in the range of 19 nm to 25 nm.

Clause 54: The solar control coating 30 of any of clauses 1 to 53, wherein the optional fourth primer layer 84 has a thickness or effective thickness in the range of 0.1 nm to 5 nm, particularly in the range of 1 nm to 5 nm, more particularly in the range of 2 nm to 4 nm.

Clause 55: The solar control coating 30 of any of clauses 1 to 54, wherein the fifth phase adjustment layer 86 has an optical thickness in the range of 40 nm to 100 nm, particularly an optical thickness in the range of 45 nm to 75 nm, more particularly an optical thickness in the range of 54 nm to 67 nm.

Clause 56: The solar control coating 30 of any of clauses 1 to 55, wherein the fifth phase adjustment layer 86 has a thickness in the range of 10 nm to 100 nm, particularly in the range of 24 nm to 37 nm, more particularly in the range of 27 nm to 34 nm.

Clause 57: The solar control coating 30 of any of clauses 1 to 56, wherein the fifth phase adjustment layer 86 comprises a first layer 88 and an optional second layer 90.

Clause 58: The solar control coating 30 of clause 57, wherein the first layer 88 comprises a metal oxide layer, particularly a zinc oxide layer.

Clause 59: The solar control coating 30 of clauses 57 or 55, wherein the optional second layer 90 comprises a metal-alloy oxide layer, particularly a zinc stannate layer.

Clause 60: The solar control coating 30 of any of clauses 57 to 59, wherein the first layer 88 has a thickness in the range of 1 nm to 20 nm, particularly in the range of 3 nm to 15 nm, more particularly in the range of 4 nm to 10 nm.

Clause 61: The solar control coating 30 of any of clauses 57 to 60, wherein the optional second layer 90 has a thickness in the range of 0 nm to 40 nm, particularly in the range of 15 nm to 30 nm, more particularly in the range of 20 nm to 30 nm.

Clause 62: The solar control coating 30 of any of clauses 1 to 61, wherein the protective layer 92 comprises at least one metal oxide or metal nitride layer, particularly titania.

Clause 63: The solar control coating 30 of any of clauses 1 to 62, wherein the protective layer 92 has a thickness in the range 1 nm to 10 nm, particularly in the range of 3 nm to 7 nm, more particularly in the range of 4 nm to 7 nm.

Clause 64: The solar control coating 30 of any of clauses 1 to 63, wherein the solar control coating 30 provides a reference IGU SHGC of not greater than 0.29, particularly not greater than 0.25, more particularly not greater than 0.24.

Clause 65: The solar control coating 30 of any of clauses 1 to 64, wherein the solar control coating 30 provides a reference IGU luminous transmittance of not greater than 65%, particularly not greater than 57%, more particularly not greater than 56%.

Clause 68: The solar control coating 30 of any of clauses 1 to 65, wherein the solar control coating 30 provides a reference IGU LSG ratio of at least 1.8, particularly at least 1.85, more particularly at least 2.

Clause 67: The solar control coating 30 of any of clauses 1 to 66, wherein the solar control coating 30 provides a sheet resistance of less than 10 ohms per square (Ω/□), particularly less than 5Ω/□, more particularly lass than 1Ω/□.

Clause 68: The solar control coating 30 of any of clauses 1 to 67, wherein the solar control coating 30 comprises the first primer layer 48.

Clause 69: The solar control coating 30 of any of clauses 1 to 68, wherein the solar control coating 30 comprises the second primer layer 60.

Clause 70: The solar control coating 30 of any of clauses 1 to 69, wherein the solar control coating 30 comprises the third primer layer 72.

Clause 71: The solar control coating 30 of any of clauses 1 to 70, wherein the solar control coating 30 comprises the fourth primer layer 84.

Clause 72: The solar control coating 30 of any of clauses 1 to 71, wherein the solar control coating 30 comprises the fifth phase adjustment layer 86.

Clause 73: The solar control coating 30 of any of clauses 1 to 72, wherein the solar control coating 30 comprises the protective layer 92.

Clause 74: The solar control coating 30 of any of clauses 1 to 73, wherein the solar control coating 30 comprises at least one of the optional layers, for example all of the optional layers.

Clause 75: The use of a solar control coating 30 of any of clauses 1 to 74 in an insulating glass unit or a laminated unit.

Clause 76: An article 10, comprising a substrate 12 and a solar control coating 30 of any of clauses 1 to 74 over at least a portion of the substrate 12.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

TABLE 1

| Sample | Type | ZS | ZO | Ag | Ti(O$_x$) | ZO | ZS | ZO | Ag | Ti | ZO | ZS |
|---|---|---|---|---|---|---|---|---|---|---|---|---|
| 1 | A | 24.4 | 14.0 | 10.1 | 1.7 | 8.6 | 45.7 | 8.4 | 14.7 | 1.7 | 9.9 | 9.3 |
| 2 | A | 24.0 | 10.3 | 16.4 | 1.7 | 8.4 | 18.7 | 7.9 | 1.7 | 0.2 | 7.7 | 18.6 |
| 3 | T | 20.3 | 8.7 | 16.5 | 3.0 | 7.4 | 18.7 | 8.5 | 2.7 | 0.5 | 7.7 | 18.7 |
| 4 | A | 20.2 | 8.7 | 11.4 | 1.7 | 13.9 | 31.5 | 13.4 | 11.6 | 1.7 | 9.2 | 20.7 |
| 5 | T | 19.1 | 8.3 | 11.5 | 3.0 | 6.6 | 44.8 | 6.9 | 11.8 | 3.0 | 8.4 | 21.8 |
| 6 | T | 19.1 | 8.3 | 11.5 | 3.0 | 6.6 | 44.8 | 6.9 | 11.8 | 3.0 | 8.4 | 21.8 |
| 7 | A | 22.8 | 8.1 | 8.7 | 1.7 | 8.1 | 28.7 | 8.3 | 4.4 | 1.7 | 8.1 | 19.4 |
| 8 | T | 22.8 | 8.1 | 8.7 | 3.7 | 8.1 | 28.7 | 8.3 | 4.4 | 3.7 | 8.1 | 19.4 |
| 9 | A | 8.0 | 8.7 | 2.7 | 0.5 | 8.0 | 14.3 | 8.2 | 13.5 | 1.7 | 7.7 | 55.8 |
| 10 | A | 0 | 8.0 | 10.9 | 1.7 | 8.7 | 64.1 | 8.2 | 15.2 | 1.7 | 8.7 | 52.2 |
| 11 | T | 19.5 | 10 | 12.1 | 3.5 | 10 | 42.9 | 10 | 13.1 | 3.5 | 10 | 26 |
| 12 | A | 19.5 | 5.7 | 10.6 | 1.4 | 9.5 | 39.4 | 9.9 | 14.2 | 1.3 | 9.6 | 30.7 |
| 13 | T | 19.0 | 7.1 | 11.4 | 2.1 | 9.2 | 41.0 | 9.3 | 13.5 | 2.1 | 8.2 | 32.7 |

| Sample | ZO | Ag | Ti | ZO | ZS | ZO | Ag | Ti | ZO | ZS | TO |
|---|---|---|---|---|---|---|---|---|---|---|---|
| 1 | 0 | 1.7 | 0.5 | 0 | 45.2 | 15.1 | 17.6 | 1.5 | 12.6 | 20.9 | 0 |
| 2 | 7.9 | 10.1 | 1.7 | 13.5 | 30.6 | 13.2 | 13.9 | 1.7 | 8.5 | 14.2 | 5.0 |
| 3 | 7.9 | 9.0 | 3.0 | 11.7 | 28.8 | 12.3 | 14.1 | 3.0 | 7.9 | 14.8 | 5.0 |
| 4 | 8.7 | 1.7 | 0.2 | 8.5 | 20.7 | 8.8 | 19.4 | 1.7 | 11.5 | 19.3 | 5.0 |
| 5 | 9.5 | 2.7 | 0.5 | 8.7 | 21.8 | 9.0 | 19.6 | 3.0 | 10.5 | 19.5 | 5.0 |
| 6 | 9.5 | 2.7 | 0.5 | 0.0 | 30.5 | 9.0 | 19.6 | 3.0 | 10.5 | 19.5 | 5.0 |
| 7 | 8.3 | 8.9 | 1.7 | 8.1 | 42.9 | 8.1 | 12.5 | 1.7 | 8.1 | 18.5 | 6.1 |
| 8 | 8.3 | 8.9 | 3.7 | 8.1 | 42.9 | 8.1 | 12.5 | 3.7 | 8.1 | 18.5 | 6.1 |
| 9 | 8.2 | 15.3 | 1.7 | 7.7 | 59.2 | 8.2 | 20.1 | 1.7 | 7.7 | 22.9 | 5.0 |
| 10 | 8.2 | 16.4 | 1.7 | 8.7 | 5.2 | 8.7 | 2.7 | 0.5 | 8.7 | 0 | 3.7 |
| 11 | 0 | 0.45 | 1.25 | 0 | 25.9 | 10 | 22.1 | 3.5 | 10 | 20.5 | 4.4 |
| 12 | 0 | 2.7 | 1.4 | 0 | 30.3 | 10.0 | 20.9 | 1.8 | 8.6 | 15.6 | 6.3 |
| 13 | 0 | 2.7 | 0.7 | 0 | 32.2 | 8.7 | 22.1 | 2.4 | 11.2 | 16.1 | 6.2 |

TABLE 2

| Sample | HT | T | RE | RI | E | SHGC | LSG | Transmitted | | | Reflected Ext. | | | Refected Int. | | |
|---|---|---|---|---|---|---|---|---|---|---|---|---|---|---|---|---|
| | | | | | | | | L* | a* | b* | L* | a* | b* | L* | a* | b* |
| 1 | N | 50.6 | 13.8 | 15.6 | 0.025 | 0.233 | 2.17 | 76.47 | −9.13 | 1.83 | 44.14 | −4.62 | −6.41 | 46.64 | −7.38 | −6.73 |
| 2 | Y | 49.0 | 18.3 | 12.5 | 0.047 | 0.235 | 2.09 | 75.5 | −8.54 | 1.8 | 49.92 | −1.05 | −2.38 | 42.11 | −0.74 | −7.14 |
| 3 | N | 49.8 | 17.7 | 12.8 | 0.035 | 0.243 | 2.05 | 76.05 | −7.9 | 1.44 | 49.14 | −3.47 | −2.36 | 42.5 | −1.63 | −6.09 |
| 4 | N | 50.1 | 13.0 | 15.7 | 0.034 | 0.230 | 2.18 | 76.12 | −9.68 | 4.61 | 42.93 | −2.61 | −4.19 | 46.79 | −4.19 | −9.45 |
| 5 | Y | 49.7 | 14.9 | 19.9 | 0.018 | 0.235 | 2.12 | 75.91 | −8.48 | 3.19 | 45.54 | −4.13 | −4.73 | 51.84 | −6.51 | −5.2 |
| 6 | Y | 46.2 | 13.7 | 20.3 | 0.019 | 0.230 | 2.01 | 73.73 | −7.23 | 2.79 | 43.85 | −2.12 | −4.95 | 52.4 | −5.63 | −7.37 |
| 7 | Y | 47.5 | 10.6 | 12.8 | 0.045 | 0.256 | 1.85 | 74.54 | −5.71 | −0.12 | 39.09 | −9.34 | −1.22 | 42.66 | −3.9 | −3.4 |

TABLE 2-continued

| Sample | HT | T | RE | RI | E | SHGC | LSG | Transmitted L* | a* | b* | Reflected Ext. L* | a* | b* | Refected Int. L* | a* | b* |
|---|---|---|---|---|---|---|---|---|---|---|---|---|---|---|---|---|
| 8 | N | 50.8 | 10.5 | 11.9 | 0.031 | 0.275 | 1.85 | 76.83 | −6.01 | −5.45 | 38.85 | −4.5 | −3.15 | 41.20 | −1.76 | −2.14 |
| 9 | Y | 51.8 | 11.2 | 16.1 | — | 0.27 | 1.85 | 77.2 | −3.60 | −1.40 | 39.90 | −3.20 | −4.00 | 47.10 | −5.20 | 1.30 |
| 10 | Y | 47.3 | 20.7 | 14.5 | — | 0.24 | 2.0 | 74.4 | −2.90 | −2.01 | 52.63 | −8.80 | −2.13 | 44.91 | 1.86 | −8.25 |
| 11 | Y | 51.0 | 12.2 | 19.2 | — | 0.234 | 2.18 | 76.7 | −5.83 | −5.83 | 41.59 | −2.42 | −4.75 | 50.87 | −5.95 | −3.15 |

What is claimed is:

1. A solar control coating, comprising:
a first phase adjustment layer;
a first metal functional layer located over the first phase adjustment layer wherein the first metal functional layer comprises silver;
an optional first primer layer located over the first metal functional layer;
a second phase adjustment layer located over the first metal functional layer;
a second metal functional layer located over the second phase adjustment layer wherein the second metal functional layer comprises silver;
an optional second primer layer located over the second metal functional layer;
a third phase adjustment layer located over the second metal functional layer;
a third metal functional layer located over the third phase adjustment layer wherein the third metal functional layer comprises silver;
an optional third primer layer located over the third metal functional layer;
a fourth phase adjustment layer located over the third metal functional layer;
a fourth metal functional layer located over the fourth phase adjustment layer wherein the fourth metal functional layer comprises silver;
an optional fourth primer layer located over the fourth metal functional layer;
an optional fifth phase adjustment layer located over the fourth metal functional layer; and
an optional protective layer located over the optional fifth phase adjustment layer,
wherein the second metal functional layer is a continuous layer having a thickness in the range of 10 nm to 20 nm,
wherein the third metal functional layer is a subcritical layer having an effective thickness in the range of 0.2 nm to 5 nm, and
wherein the solar control coating provides reference insulating glass unit ("IGU") values of luminous transmittance no greater than 64%, and solar heat gain coefficient ("SHGC") of no greater than 0.5.

2. The solar control coating of claim 1, wherein the first phase adjustment layer has an optical thickness in the range of 45 nm to 75 nm.

3. The solar control coating of claim 1, wherein the second phase adjustment layer has an optical thickness in the range of 100 nm to 150 nm.

4. The solar control coating of claim 1, wherein the third phase adjustment layer has an optical thickness in the range of 57 nm to 87 nm.

5. The solar control coating of claim 1, wherein the fourth phase adjustment layer has an optical thickness in the range of 55 nm to 86 nm.

6. The solar control coating of claim 1, wherein the first metal functional layer is a continuous layer and has a thickness in the range of 10 nm to 15 nm.

7. The solar control coating of claim 1, wherein the third metal functional layer comprises a subcritical layer having an effective thickness in the range of 0.2 nm to 1 nm.

8. The solar control coating of claim 1, wherein the fourth metal functional layer is a continuous layer having a thickness in the range of 5 nm to 30 nm.

9. The solar control coating of claim 1, wherein the optional third primer layer has a thickness or effective thickness in the range of 0.1 nm to 2 nm.

10. The solar control coating of claim 1, wherein the optional fifth phase adjustment layer has an optical thickness in the range of 45 nm to 75 nm.

11. The solar control coating of claim 1, wherein the optional protective layer comprises titania.

12. The solar control coating of claim 1, wherein the solar control coating provides a reference IGU SHGC of not greater than 0.24, a reference IGU luminous transmittance of not greater than 55%, and a reference IGU light solar gain ("LSG") ratio of at least 1.73.

13. A solar control coating, comprising:
a first phase adjustment layer;
a first metal functional layer located over the first phase adjustment layer wherein the first metal functional layer comprises silver;
an optional first primer layer located over the first metal functional layer;
a second phase adjustment layer located over the first metal functional layer;
a second metal functional layer located over the second phase adjustment layer wherein the second metal functional layer comprises silver;
an optional second primer layer located over the second metal functional layer;
a third phase adjustment layer located over the second metal functional layer;
a third metal functional layer located over the third phase adjustment layer wherein the third metal functional layer comprises silver;
an optional third primer layer located over the third metal functional layer;
a fourth phase adjustment layer located over the third metal functional layer;
a fourth metal functional layer located over the fourth phase adjustment layer wherein the fourth metal functional layer comprises silver;
an optional fourth primer layer located over the fourth metal functional layer;
an optional fifth phase adjustment layer located over the fourth metal functional layer; and
an optional protective layer located over the optional fifth phase adjustment layer, wherein at the second metal functional layer is a subcritical layer having an effective thickness in the range of 1 nm to 5 nm, wherein the third metal functional layer is a continuous layer having a thickness in the range of 8 nm to 20 nm, and wherein the solar control coating provides reference insulating glass unity ("IGU") values of luminous transmittance no greater than 64%, and solar heat gain coefficient ("SHGC") of no greater than 0.5.

14. The solar control coating of claim 13, wherein the first phase adjustment layer has an optical thickness in the range of 45 nm to 75 nm, wherein the second phase adjustment layer has an optical thickness in the range of 100 nm to 150 nm, wherein the third phase adjustment layer has an optical thickness in the range of 57 nm to 87 nm, and wherein the fourth phase adjustment layer has an optical thickness in the range of 55 nm to 86 nm.

15. The solar control coating of claim 13, wherein the first metal functional layer has a thickness in the range of 10 nm to 15 nm, and wherein the fourth metal functional layer has a thickness in the range of 5 nm to 30 nm.

16. The solar control coating of claim 13, wherein the optional fifth phase adjustment layer has an optical thickness in the range of 45 nm to 75 nm.

17. A solar control coating, comprising:
a first phase adjustment layer;
a first metal functional layer located over the first phase adjustment layer wherein the first metal functional layer comprises silver;
an optional first primer layer located over the first metal functional layer;
a second phase adjustment layer located over the first metal functional layer;
a second metal functional layer located over the second phase adjustment layer wherein the second metal functional layer comprises silver;
an optional second primer layer located over the second metal functional layer;
a third phase adjustment layer located over the second metal functional layer;
a third metal functional layer located over the third phase adjustment layer wherein the third metal functional layer comprises silver;
an optional third primer layer located over the third metal functional layer;
a fourth phase adjustment layer located over the third metal functional layer;
a fourth metal functional layer located over the fourth phase adjustment layer wherein the fourth metal functional layer comprises silver;
an optional fourth primer layer located over the fourth metal functional layer;
an optional fifth phase adjustment layer located over the fourth metal functional layer; and
an optional protective layer located over the optional fifth phase adjustment layer, wherein the first metal functional layer is a subcritical layer having an effective thickness in the range of 1 nm to 5 nm or the fourth metal functional layer is a subcritical layer having an effective thickness in the range of 1 nm to 5 nm, wherein the first metal functional layer and the fourth metal functional layer cannot both be subcritical layers having an effective thickness in the range of 1 nm to 5 nm, and wherein the solar control coating provides reference insulating glass unity ("IGU") values of luminous transmittance no greater than 64%, and solar heat gain coefficient ("SHGC") of no greater than 0.5.

18. The solar control coating of claim 17, wherein the first phase adjustment layer has an optical thickness in the range of 46 nm to 75 nm, wherein the second phase adjustment layer has an optical thickness in the range of 100 nm to 150 nm, wherein the third phase adjustment layer has an optical thickness in the range of 57 nm to 87 nm, and wherein the fourth phase adjustment layer has an optical thickness in the range of 55 nm to 86 nm.

19. The solar control coating of claim 17, wherein the second metal functional layer comprises a continuous layer having a thickness in the range of 10 nm to 20 nm, and wherein the third metal functional layer is a continuous layer having a thickness in the range of 10 nm to 20 nm.

20. The solar control coating of claim 17, wherein the optional fifth phase adjustment layer has an optical thickness in the range of 45 nm to 75 nm.

* * * * *

UNITED STATES PATENT AND TRADEMARK OFFICE
CERTIFICATE OF CORRECTION

| | | |
|---|---|---|
| PATENT NO. | : 10,345,499 B2 | Page 1 of 1 |
| APPLICATION NO. | : 15/013600 | |
| DATED | : July 9, 2019 | |
| INVENTOR(S) | : Paul A. Medwick et al. | |

It is certified that error appears in the above-identified patent and that said Letters Patent is hereby corrected as shown below:

On the Title Page

Page 2, Column 1, under FOREIGN PATENT DOCUMENTS, Line 5, delete "WO 2014164685 A1 10/2014" and insert -- WO 2014164695 A1 10/2014 --

In the Claims

Column 25, Line 1, Claim 13, after "wherein" delete "at"

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*